United States Patent [19]

Suzuki et al.

[11] Patent Number: 5,402,295
[45] Date of Patent: Mar. 28, 1995

[54] MAGNETIC RECORDING HEAD CAPABLE OF DEFINING NARROW TRACK WIDTH AND MAGNETIC RECORDING APPARATUS USING THE SAME

[75] Inventors: Hiroshi Suzuki, Kokubunji; Hideo Todokoro, Hinodemachi, both of Japan; Hisashi Takano, St. Paul, Minn.; Hiroyuki Shinada, Chofu, Japan

[73] Assignee: Hitachi, Ltd., Tokyo, Japan

[21] Appl. No.: 893,042

[22] Filed: Jun. 3, 1992

Related U.S. Application Data

[63] Continuation-in-part of Ser. No. 683,719, Apr. 11, 1991.

[30] Foreign Application Priority Data

| Apr. 16, 1990 | [JP] | Japan | 2-097659 |
| Sep. 14, 1990 | [JP] | Japan | 2-242340 |
| Jun. 3, 1991 | [JP] | Japan | 3-130978 |

[51] Int. Cl.$^6$ .................. G11B 5/147; G11B 5/187
[52] U.S. Cl. .................. 360/126; 360/119; 360/121; 360/122; 360/113
[58] Field of Search ........ 360/103, 104, 113, 119–122, 360/125, 126

[56] References Cited

U.S. PATENT DOCUMENTS

| 4,797,766 | 1/1989 | Enz | 360/113 |
| 4,873,599 | 10/1989 | Sueoka | 360/126 |
| 4,907,113 | 3/1990 | Mallary | 360/113 |
| 4,931,886 | 6/1990 | Mallary | 360/123 |
| 4,939,609 | 7/1990 | Zierer et al. | 360/125 |
| 4,974,110 | 11/1990 | Kanamine et al. | 360/126 |
| 5,016,342 | 5/1991 | Pisharody et al. | 360/121 |
| 5,095,397 | 3/1992 | Nagata et al. | 360/113 |
| 5,189,580 | 2/1993 | Pisharody et al. | 360/126 |

FOREIGN PATENT DOCUMENTS

| 404332 | 12/1990 | European Pat. Off. . |
| 4020206 | 1/1991 | Germany . |
| 60-37130 | 2/1985 | Japan . |
| 63-271708 | 11/1988 | Japan . |
| 63-281209 | 11/1988 | Japan . |
| 2128313 | 5/1990 | Japan . |

OTHER PUBLICATIONS

IEEE Transactions on Magnetics, vol. 24, No. 6, Nov. 1988, J. Kishigami et al., pp. 2841–2843.

*Primary Examiner*—Stuart S. Levy
*Assistant Examiner*—Jefferson Evans
*Attorney, Agent, or Firm*—Fay, Sharpe, Beall, Fagan, Minnich & McKee

[57] ABSTRACT

A magnetic head has a peripheral magnetic field, which is weaker than the coercivity of a recording medium, that is formed beside or around magnetic poles that define a narrow track width. This reinforces a longitudinal magnetic field produced by the head which has been weakened by reducing the cross section of each of the magnetic poles in an effort to obtain the narrow track width. That is, the longitudinal magnetic field distribution formed by the magnetic head is provided by a combination of the principal region having the strongest magnetic field for defining the narrow track width, and the region having a weak magnetic field formed beside or around the principal region. In this way, the combined magnetic field is stronger that the coercivity of the recording medium, but only at the magnetic poles so a narrow track width is achieved.

15 Claims, 12 Drawing Sheets

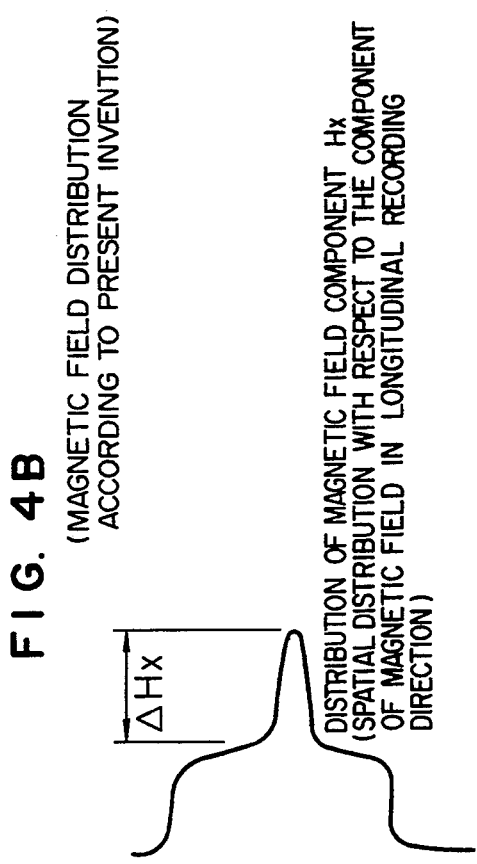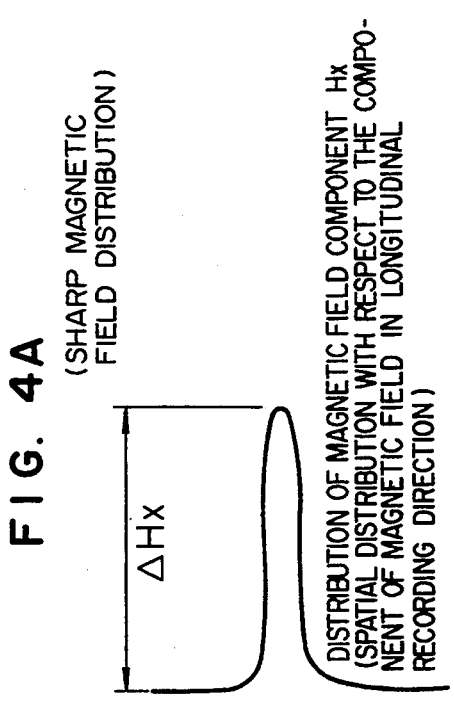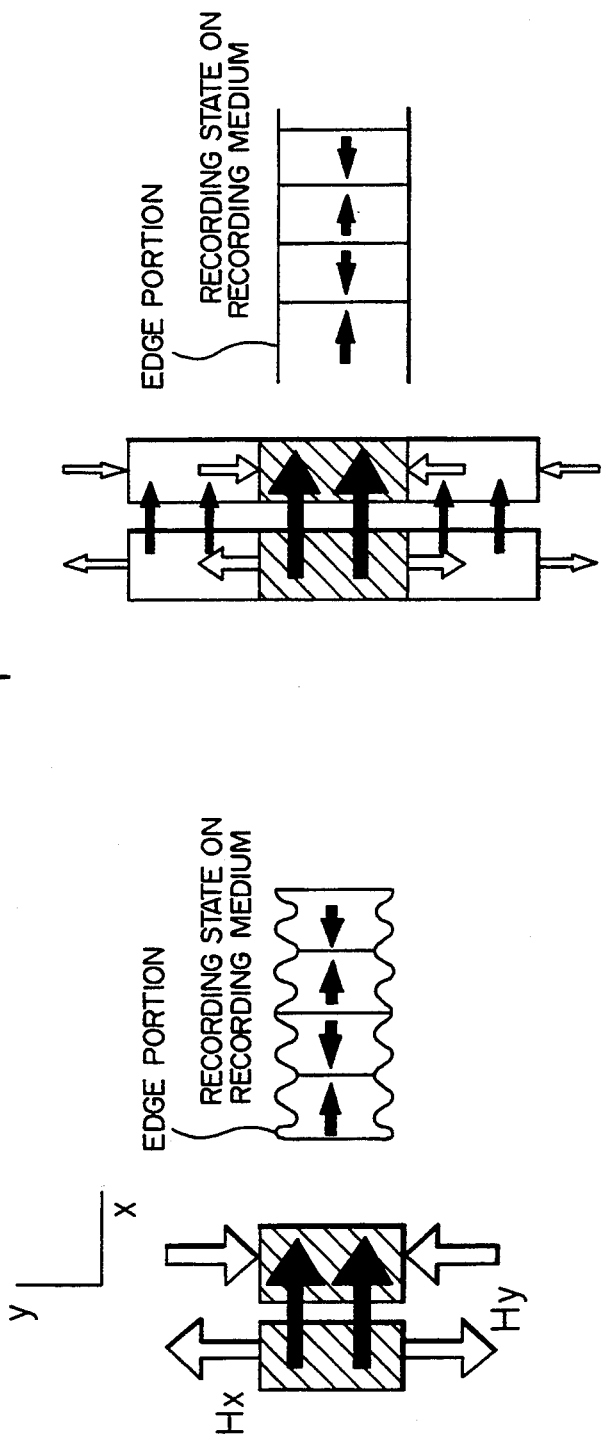
FIG. 4A (SHARP MAGNETIC FIELD DISTRIBUTION)
FIG. 4B (MAGNETIC FIELD DISTRIBUTION ACCORDING TO PRESENT INVENTION)

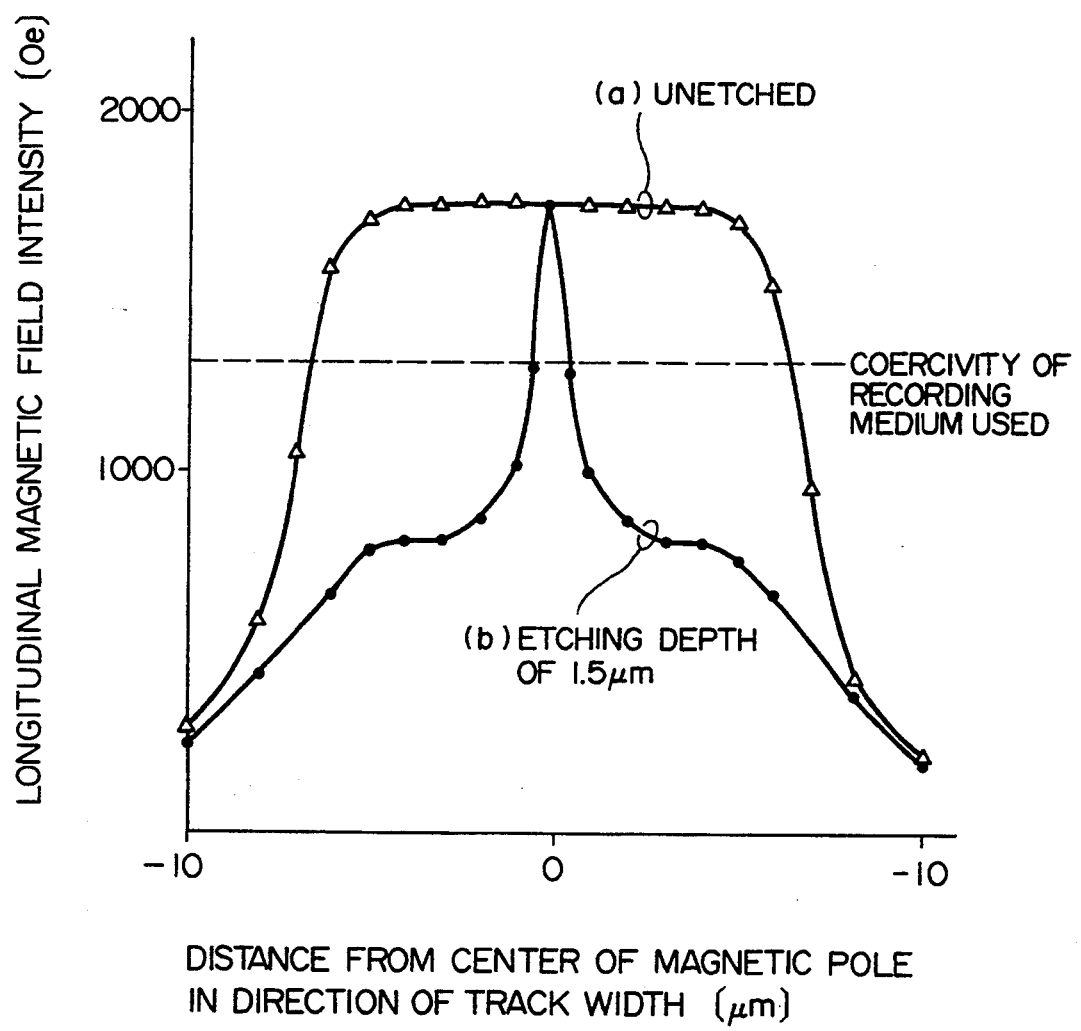

F I G. 13
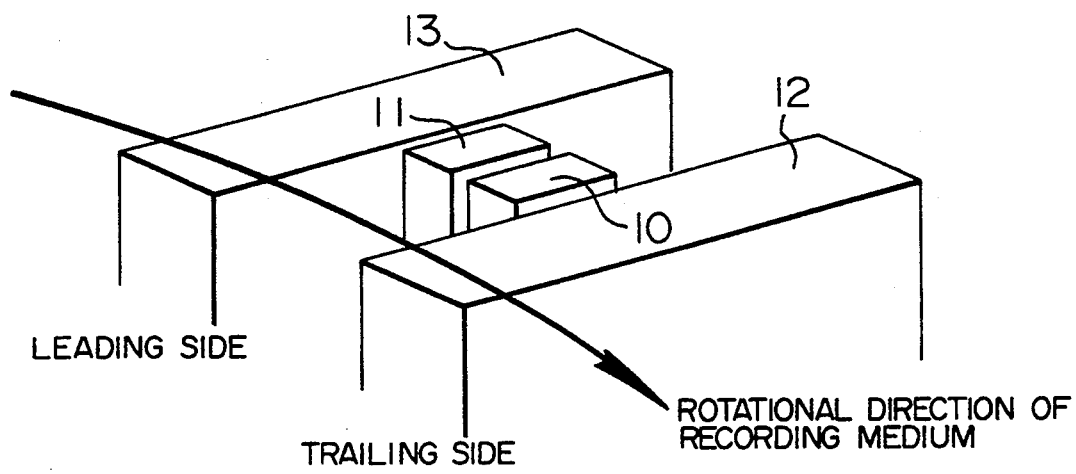
F I G. 14
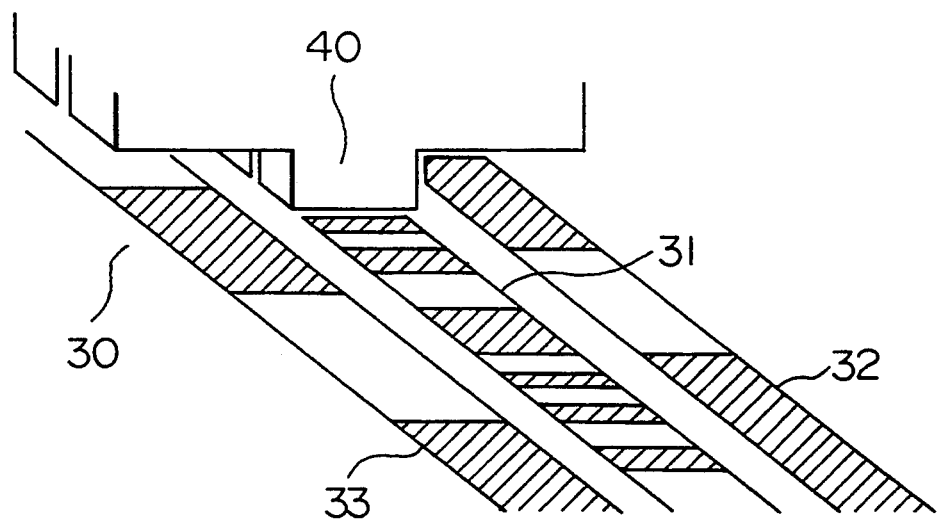

MAGNETIC RECORDING HEAD CAPABLE OF DEFINING NARROW TRACK WIDTH AND MAGNETIC RECORDING APPARATUS USING THE SAME

The present application is a continuation-in-part of U.S. application Ser. No. 07/683,719, filed on Apr. 11, 1991.

BACKGROUND OF THE INVENTION

The present invention relates to a magnetic head for use in an information recording apparatus utilizing a magnetic recording medium, and more particularly to a magnetic head having a narrow track width for performing magnetic recording on a magnetic medium at a high recording density.

In order to attain high density recording and large capacity recording in magnetic recording, it is necessary to make the track width defined by a magnetic head narrow. Further, the coercivity of a recording medium has been increased in accordance with the high density recording and the large capacity recording. Thus, the magnetic head is required to define a narrow track width and moreover to generate a strong magnetic field capable of magnetizing the magnetic recording medium.

As a method of reducing the track width defined by a magnetic head, processes such as sputtering and ion-milling are used for making small the dimensions of the magnetic head corresponding to the track width. According to this method, however, a magnetic path at the tip of a magnetic pole has a narrow cross section, and thus the magnetization of the magnetic pole is first saturated at the tip. Accordingly, the magnetic pole cannot generate a strong magnetic field capable of magnetizing the recording medium. In order to solve this problem, the thickness of the magnetic pole in a longitudinal recording direction is increased, and thus the magnetic saturation at the tip of the magnetic pole can be suppressed.

In order to make a magnetic head correspond to a desired track width in manufacturing processes, ion-beam etching using a carbon fluoride gas is carried out for, for example, for an aluminum oxide ($Al_2O_3$) film. That is, dimensions of the magnetic head corresponding to the track width are determined by the alumina masking method (refer to JP-A-60-37130). Further, in order to obtain a magnetic head which has a thick magnetic pole, that can define the width of a recording track accurately, and that generates a strong magnetic field capable of magnetizing a high-coercivity recording medium, a method of manufacturing a magnetic head has been proposed in which an upper pole is divided into two parts (refer to, for example, JP-A-63-81209).

Further, a method of making the small dimensions of a magnetic head corresponding to a track width, by stepping the tip of a magnetic pole after the air bearing surface of the magnetic head has been polished, is described in, for example, an article by J. Kishigami et. al. (IEEE Trans. Magn., Vol. 24, No. 6, pp. 2841–2843, Nov. 1988). In this article, the tip of the magnetic pole is stepped by the ion-milling method using a photoresist layer as a masking film.

SUMMARY OF THE INVENTION

According to the above-described prior art methods, the dimensions of a magnetic head corresponding to a track width are 3 to 5 $\mu$m at best. Further, when the above dimensions of the magnetic head are to be further reduced, a magnetic path is obliged to have a narrow cross section at the tip of a magnetic pole, and thus the magnetic head cannot generate a strong magnetic field capable of magnetizing a high-coercivity recording medium.

Prior U.S. application Ser. No. 07/683719 (corresponding to European Patent Application No. 91105963.2 filed on Apr. 15, 1991) discloses a method of fabricating a magnetic head capable of defining a narrow track width, and the characteristics and effects of the magnetic head, but fails to disclose a magnetic field generated by the magnetic head. On the other hand, the present application discloses the characteristics and effects of a magnetic field generated by the above magnetic head capable of defining the narrow track width, and the structure of the magnetic head for producing the magnetic field characteristics.

FIG. 2 is a schematic diagram showing a cross section of a conventional, thin-film magnetic head. Referring to FIG. 2, an upper pole 1 and a lower pole 2 are both formed of a magnetic film, to make a magnetic circuit. Each of the upper pole 1 and the lower pole 2 is formed of a mono-layer film which is made of a magnetic material high in saturated magnetic flux density such as permalloy (that is, Ni-Fe alloy), or a multilayer film which has a structure in which an insulating layer such as an aluminum oxide layer is sandwiched between adjacent permalloy layers. Further, a coil 3 is made of, for example, aluminum (Al), copper (Cu), chromium (Cr), or others.

When a current is caused to flow through the coil 3, a magnetic flux corresponding to the current passes through a magnetic circuit made up of the upper pole 1 and the lower pole 2. The magnetic flux passing through the magnetic circuit is first saturated at a place 4 where the upper and lower poles have a minimum cross section, and a magnetic flux greater than the saturated magnetic flux cannot pass through the place 4. Accordingly, a magnetic field generated at the tips of the poles 1 and 2 for performing a recording operation, cannot be made stronger than a magnetic field corresponding to the above saturated magnetic flux.

FIG. 3 is a graph showing examples of a relation between an exciting current and the peak value of the longitudinal magnetic field (that is, a component in a longitudinal recording direction of a magnetic field generated by a magnetic head). In FIG. 3, it is to be noted that a driving frequency of 10 MHz is used, and the measurement of the longitudinal magnetic field is made at a position which is spaced apart from the tip of each magnetic pole by a distance of 1 $\mu$m. As is apparent from FIG. 3, it is impossible to increase the peak value of longitudinal magnetic field in proportion to the exciting current, because the magnetic path made up of the upper and lower poles 1 and 2 is put in the state of magnetic saturation. Further, a minimum exciting current corresponding to the magnetic saturation of the magnetic path decreases as dimensions of a magnetic head corresponding to a track width are smaller, that is, the cross section of each magnetic pole is smaller.

As can be seen from the above, when a narrow recording track is formed only by making magnetic poles of a magnetic head small in size, the magnetic head cannot generate a strong magnetic field for magnetizing a magnetic recording medium.

A feature of the present invention resides in that a magnetic field weaker than the coercivity of a recording medium is formed beside or around magnetic poles for defining a narrow track width, to reinforce a longitudinal magnetic field which has been weakened by reducing the cross section of each of the magnetic poles, thereby making only a magnetic field for defining the narrow track width stronger than the coercivity of the recording medium. The present invention can be realized by the following methods. That area of the pole face of each magnetic pole which exists on one side or both sides of an area for defining a predetermined track width, is etched so that only the area for defining the track width is kept unetched. That is, the distance between the surface area existing beside the track-width defining area and the air bearing surface of a magnetic head for a recording medium, is made greater than the distance between the track-width defining area and the air bearing surface. That portion of each magnetic pole which is formed on one side or both sides of a basic portion for defining a predetermined track width, is made of at least one magnetic material which is smaller in saturated magnetic flux density than a magnetic material for making the basic portion. A pair of additional magnetic poles are disposed beside a magnetic path which generates a magnetic field for defining a small track width, or disposed so that magnetic poles for defining the narrow track width and the additional magnetic poles are arranged along a longitudinal direction, to reinforce the magnetic field for defining the narrow track width with a magnetic field generated by the additional magnetic poles.

Owing to the above structure of a magnetic head according to the present invention, the longitudinal magnetic field distribution formed by the magnetic head is given by a combination of a principal region having the strongest magnetic field for defining a narrow track width, and a region having a weak magnetic field and formed besides or around the principal region. Thus, a magnetic field which has been weakened by reducing dimensions of the magnetic head corresponding to a track width, is increased by a magnetic field which is formed beside or around the principal region and is weaker than the coercivity of a recording medium. Thus, only a magnetic field for defining a narrow track width can be made stronger than the coercivity of the recording medium.

FIG. 1 shows an example of the spatial distribution of the longitudinal magnetic field generated by the above structure, in the direction of track width. As shown in FIG. 1, a magnetic field distribution which is indicated by a broken curve and is based upon only magnetic poles for defining a narrow track width, is reinforced with an additional magnetic field which is generated beside or around the magnetic poles. Thus, the reinforced (combined) magnetic field is stronger than the coercivity of a recording medium only at the magnetic poles. That is, magnetic recording for a high-coercivity recording medium becomes possible, whereas such magnetic recording is impossible in a case where the cross section of each magnetic pole is merely reduced.

Now, let us assume that a magnetic head for defining a narrow track width generates a magnetic field distribution where a steep slope is formed at both ends of a principal region, and which is devoid of a weak magnetic field (that is, background magnetic field) spread beside or around the principal region. This magnetic field distribution is inferior to the magnetic field distribution formed by a magnetic head according to the present invention. The reason for this will be explained below, with reference to FIGS. 4A and 4B. It is to be noted that, in FIGS. 4A and 4B, an x-direction indicates a longitudinal recording direction, and a y-direction indicates the direction of track width. In a case where a longitudinal magnetic field (that is, x-magnetic field component) has a sharp peak as shown in FIG. 4A, a y-magnetic field component which has a sharp peak corresponding to the sharp peak of the longitudinal magnetic field is concentrated on the side edges of each magnetic pole on the basis of the continuity of the magnetic lines of force. The intensity of the y-magnetic field component is proportional to the height $\Delta H_x$ of the x-magnetic field component between a base and a peak. The y-magnetic field component is concentrated on both edges of a recording track, and thus the magnetization of the edges of the recording track is disturbed as shown in FIG. 4A. When a reproducing operation is performed for the recording track, the above magnetic disturbance will generate noise.

On the other hand, in a case where the longitudinal magnetic field (namely, x-magnetic field component) has the distribution shown in FIG. 4B, a magnetic field $H_x$ is given by the combination of a peripheral background magnetic field and a central magnetic field for defining a small track width, and thus can have a large value. Since the peripheral magnetic field does not have a y-component, the y-magnetic field component is independent of the peripheral magnetic field, and depends upon only a height $\Delta H_x$ between a background value and a peak value. Since the height $\Delta H_x$ is small, the y-magnetic field component concentrated on both edges of a recording track is far weaker than that of FIG. 4A. Accordingly, the recording state at the edges of the recording track is scarcely disturbed by the y-magnetic field component. Thus, noise generated in a reproducing period is reduced to a great degree.

BRIEF DESCRIPTION OF THE DRAWINGS

FIGS. 4A and 4B are diagrams for explaining that the y-component of a magnetic field generated by a magnetic head is weakened by the present invention.

FIG. 7 is a graph showing the longitudinal magnetic field distribution along the direction of track width in a case where a pole face is not etched by an ion beam, and in a case where edge portions of the pole face are etched by the ion beam.

FIG. 13 is a schematic diagram for explaining the structure of the tip of the magnetic pole portion of a magnetic head according to the sixth embodiment of the present invention.

FIG. 14 is a schematic diagram for explaining the seventh embodiment of the present invention.

DESCRIPTION OF THE PREFERRED EMBODIMENTS

EMBODIMENT-1

Figure 1:
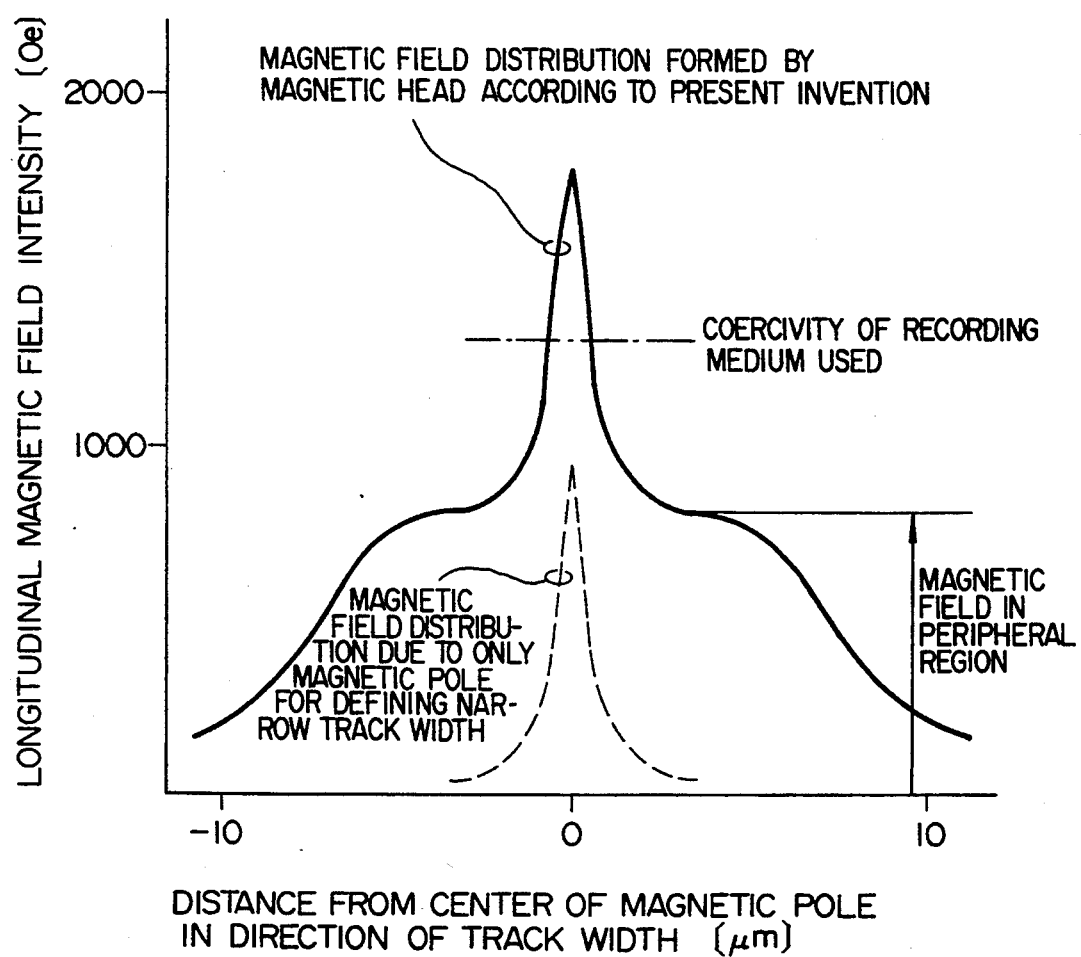
FIG. 1 is a graph showing the longitudinal magnetic field distribution along the direction of track width according to the present invention.
Figure 2:
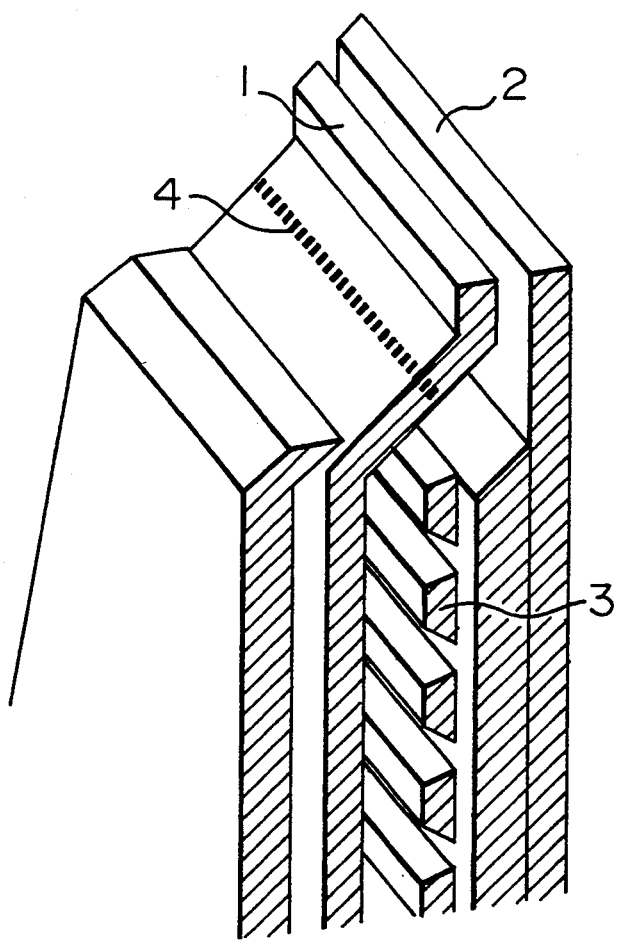
FIG. 2 is a schematic diagram for explaining a cross-sectional structure of a conventional, thin-film magnetic head for forming a magnetic circuit.
Figure 3:
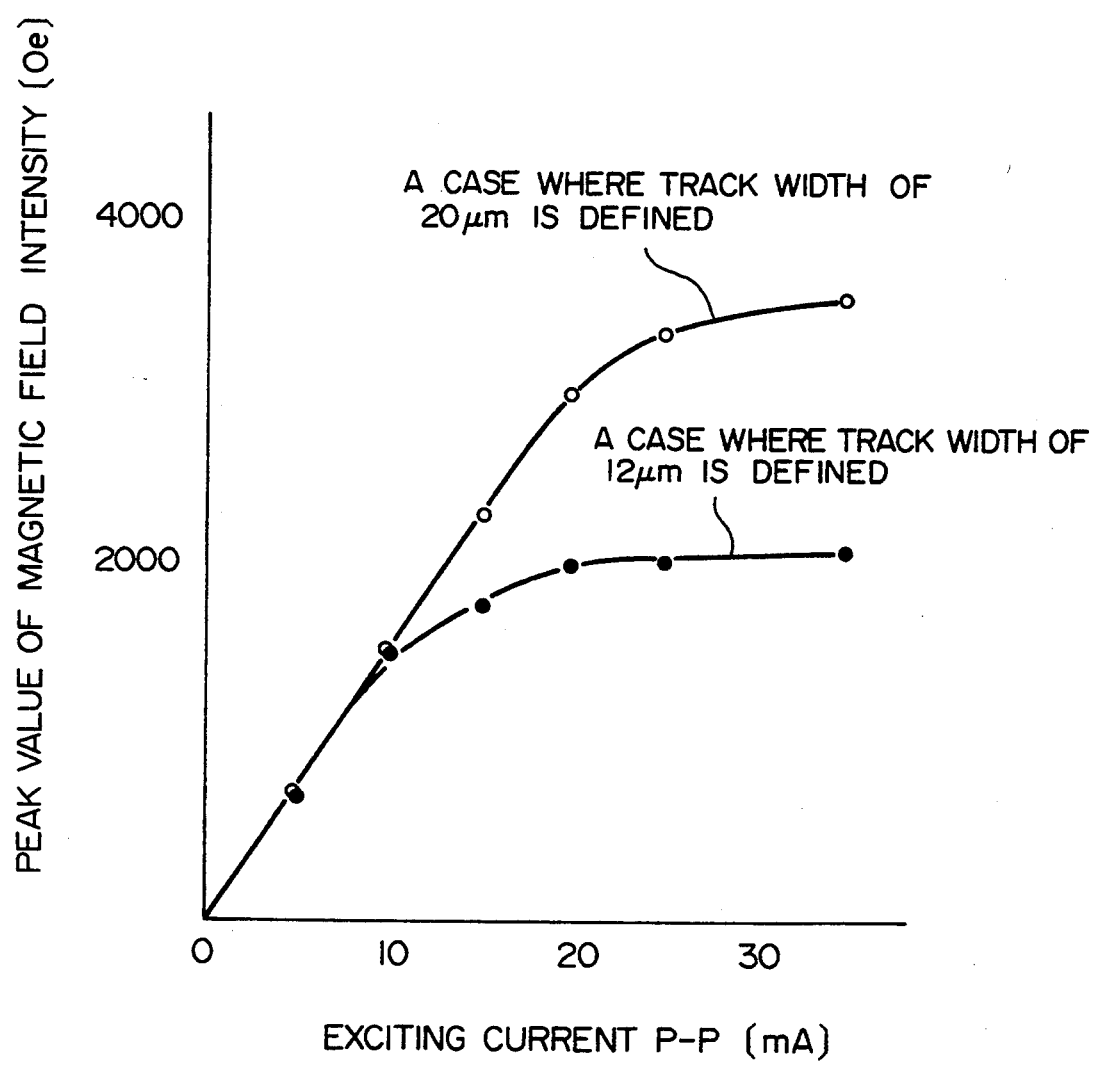
FIG. 3 is a graph showing relations between an exciting current and the peak value of a recording magnetic field.
Figure 5:
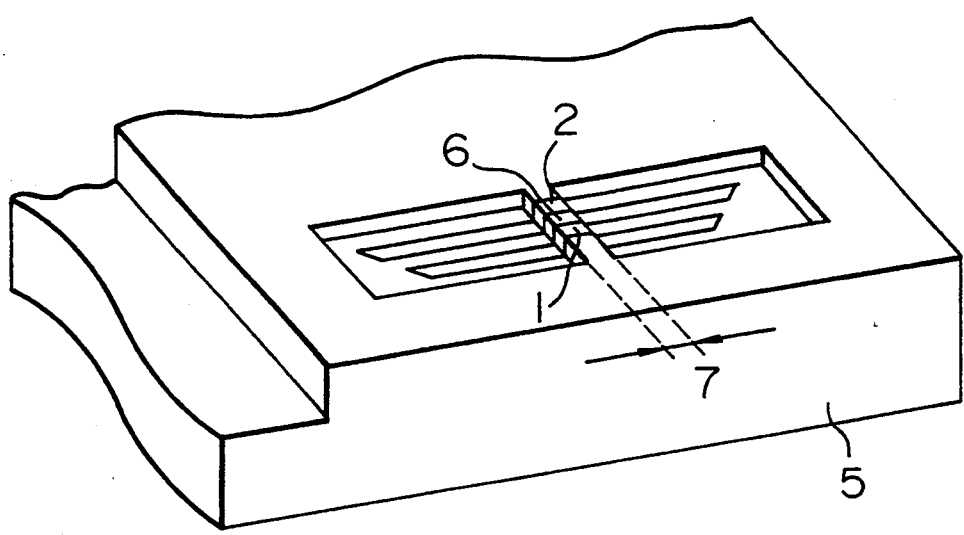
FIG. 5 is a schematic diagram for explaining the structure of a thin-film magnetic head according to the first embodiment of the present invention, and corresponds to FIG. 1 of prior U.S. application Ser. No. 07/683,719.
Figure 6:
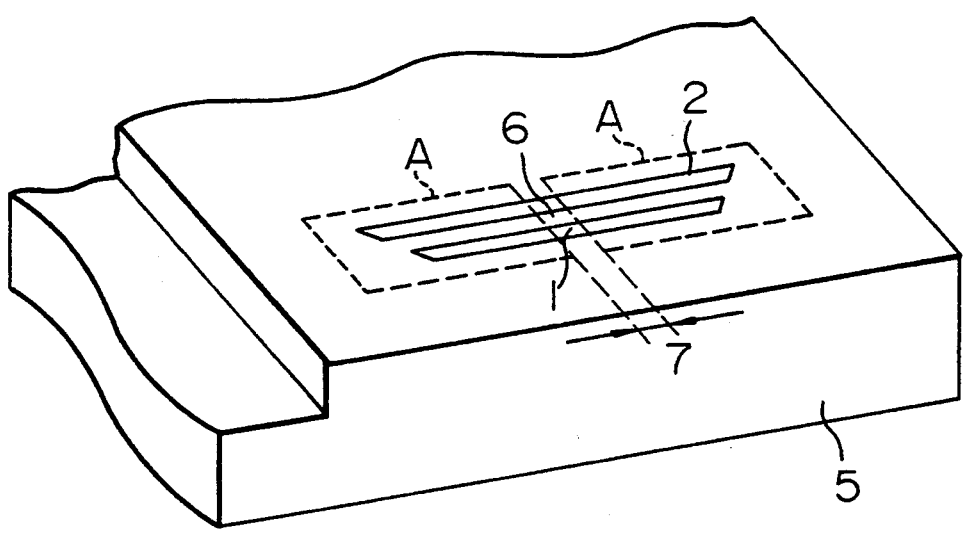
FIG. 6 is a schematic diagram for explaining the structure of the air bearing surface of the thin-film magnetic head of FIG. 5.

An embodiment of the present invention will be explained below, with reference to the drawings. FIG. 5 shows the structure of a magnetic head of a kind according to the present invention, viewed from an air bearing surface, and corresponds to FIG. 1 of prior U.S. application, Ser. No. 07/683,719. The magnetic head is fabricated in such a manner that the portion of the air bearing surface of the thin-film magnetic head of FIG. 6 which is indicated by reference character A, is selectively etched by a focused ion beam. In FIG. 5, reference numeral 1 designates an upper pole, and 2 a lower pole. These poles 1 and 2 are exposed to an air bearing surface. Further, reference numeral 5 designates a sliding substrate, and 6 the gap between the upper pole and the lower pole.

In this magnetic head, surface portions which exist on both sides of a portion 7 corresponding to a small track width, are etched to a predetermined depth by a focused ion beam from the air bearing surface side so that the portion 7 is left unetched. Thus, a difference in level is formed at the tip of the magnetic head. Although a structure that surface portions existing on both sides of the portion 7 are etched is shown in FIG. 5, the magnetic head according to the present embodiment is not limited to such a symmetrical structure.

FIG. 7 shows an example of a magnetic field distribution which is generated by the above magnetic head and is actually measured. In FIG. 7, a curve (a) indicates a longitudinal magnetic field distribution (along the direction of track width) measured before the tip of the magnetic head is etched, and a curve (b) indicates a longitudinal magnetic field distribution measured after the tip of the magnetic head has been selectively etched to a depth of 1.5 μm. The measurement of magnetic field distribution was made by the electron beam computerized tomography method using the Lorentz effect. The longitudinal magnetic field distribution formed by the magnetic head having been etched, has a sharp peak at a central region. The value of the peak is equal to the magnetic field obtained at a time when the tip of the magnetic head is not yet etched, and a magnetic field on both sides of the peak is about one half the peak value. The width of the peak is nearly equal to the width (1 μm) of the unetched portion (of a pole face) for defining a small track width. Since a recording medium having a coercivity of 1,300 Oe is used, the above magnetic head can write information on a narrow recording track of the recording medium. That is, the magnetic head can perform a recording operation for a narrow recording track having a width 1.2 μm or less.

In the present embodiment, the magnetic head is etched by a focused ion beam. Alternatively, the magnetic head may be etched by using usual photolithographic processes. That is, in the manufacturing process of a magnetic head, a difference in level may be formed at the tip of each magnetic pole by sputtering or ion milling. The magnetic head thus obtained can exhibit the same effect as that of the magnetic head according to the present embodiment.

Further, a bottom surface due to the etching is not always required to be parallel to the air bearing surface, but may be inclined to the air bearing surface in the direction of track width or in a longitudinal recording direction.

In order to eliminate a difference in level at the tip of the magnetic head and to make the tip of the magnetic head flat, an etched surface portion is filled with a non-magnetic material, and the pole face thus obtained is polished. A magnetic head having been subjected to such processing is suitable for use with a magnetic disk storage. Alternatively, the etched surface portion may be filled with a magnetic material which is lower in saturated magnetic flux density than the magnetic material for making the main magnetic circuit. A magnetic head fabricated in the above-manner can produce the same magnetic field distribution as that formed by a magnetic head in which the etched surface portion is filled with a non-magnetic material.

EMBODIMENT-2

Figure 8A:
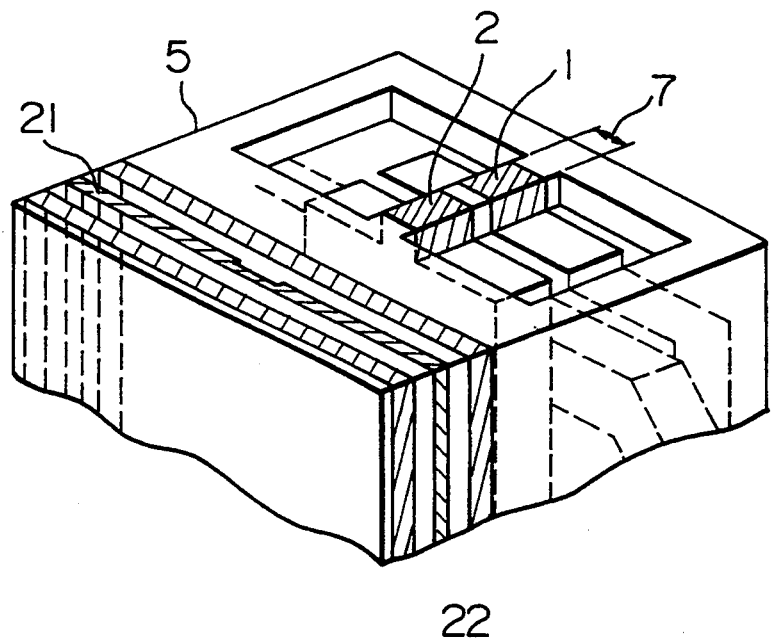
FIG. 8A is a diagram showing a read/write magnetic head according to the present invention.

A magnetoresistive sensor was disposed in the neighborhood of the lower pole of the magnetic head mentioned in the EMBODIMENT-1, to form a read/write magnetic head. FIG. 8A shows the structure of this read/write magnetic head. As shown in FIG. 8A, a magnetoresistive sensor 21 sandwiched between shielding layers 22 is disposed in the neighborhood of the lower pole. The shielding layers 22 are made of a magnetic material. Two magnetic heads having the above structure were fabricated. In these magnetic heads, a main magnetic field for defining a small track width was made stronger than the coercivity of a recording medium. In one of the magnet heads, a peripheral magnetic field formed on both sides of the main magnetic field was made stronger than the anisotropy field of the magnetoresistive sensor 21. In the other magnetic head, the peripheral magnetic field was weaker than the above anisotropy field. The magnetic field distribution formed by each of the magnetic heads was determined by the electron beam computerized tomography method using the Lorentz effect.

The reproducing characteristics of these magnetic heads were compared. The magnetic head which generates a peripheral magnetic field stronger than the anisotropy field of the magnetoresistive sensor 21, can generate a reproduced signal which is low in noise level. The reason for this is as follows. Since the peripheral magnetic field is stronger than the anisotropy field of the magnetoresistive sensor 21, magnetic domains in the magnetoresistive sensor 21 are oriented in the same direction all over the region extending from a central portion of the sensor 21 to a peripheral portion thereof, by a magnetic field which is generated from the magnetic poles to perform a recording operation, and thus no domain wall is formed in the magnetoresistive sensor 21.

On the other hand in the magnetic head which generates a peripheral magnetic field weaker than the anisotropy field of the magnetoresistive sensor, a strong magnetic field for defining the narrow track width is applied to only a central portion of the magnetoresistive sensor 21. Accordingly, the central portion of the sensor 21 is different in direction of magnetization from a peripheral portion of the sensor 21. Thus, a domain wall is formed in the magnetoresistive sensor 21. It has been confirmed that when a reproducing operation is performed in a state that such a domain wall is left in the magnetoresistive sensor 21, Barkhausen noise is increased. The experimental results show that it is preferable to make the peripheral magnetic field stronger than the anisotropy field of the magnetoresistive sensor 21 and weaker than the coercivity of a recording medium.

Figure 8B:
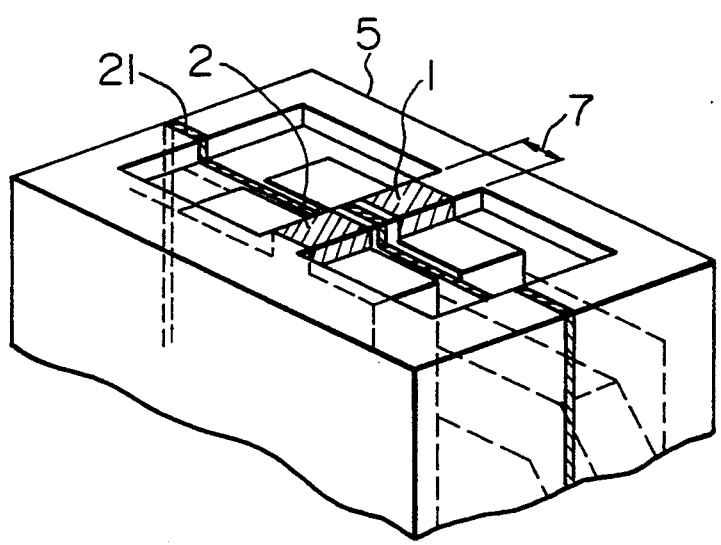
FIG. 8B is a diagram showing another read/write magnetic head according to the present invention, and corresponds to FIG. 12 of prior U.S. application Ser. No. 07/683,719.

In the above, explanation has been made of the magnetic head in which the magnetoresistive sensor 21 is disposed in the neighborhood of the magnetic poles 1 and 2. Alternatively, the magnetoresistive sensor 21 may be disposed in a central portion of the gap between the upper pole 1 and the lower pole 2, as shown in FIG. 8B. FIG. 8B corresponds to FIG. 12 of the prior U.S. application.

EMBODIMENT-3

A magnetic head mentioned in EMBODIMENT-1 is combined with a magnetic recording medium having characteristics which will be explained below, to obtain magnetic disk storage capable of performing magnetic recording for a narrow track.

Figure 15:
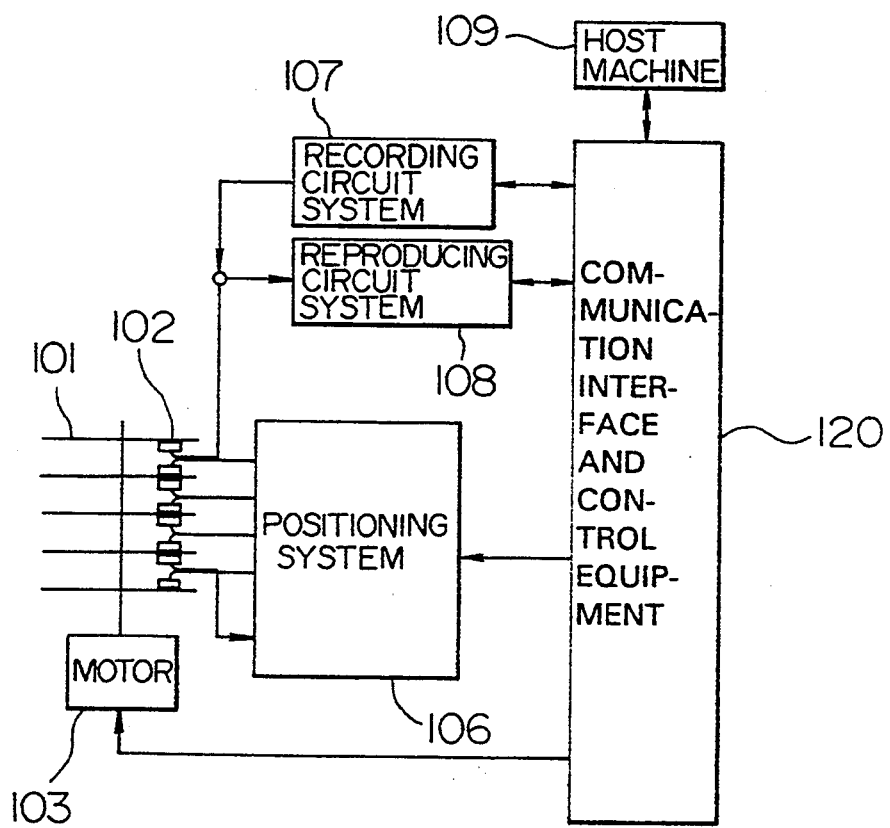
FIG. 15 is a diagram showing the entire construction of a magnetic disk storage.

FIG. 15 shows the whole structure of the magnetic disk storage. Reference numeral 101 designates a magnetic recording medium, 102 a magnetic head, 103 a motor for rotating magnetic disks, 106 a positioning system for moving the magnetic head to a predetermined position on the medium, 107 a recording circuit system, 108 a reproducing circuit system, 109 a host machine and 120 communication interface and control equipment for interfacing communications between the whole control and the host machine. As the magnetic head 102, the magnetic head according to EMBODIMENT-1 is used here.

In a case where a magnetic head mentioned in EMBODIMENT-1 performs a recording operation for a recording medium, when a ratio of the residual magnetization m in the recording medium caused by a peripheral magnetic field to the residual magnetization M in the recording medium caused by a main magnetic field for defining a narrow track width is less than 1/20, the magnetic recording for a narrow track can be made.

Figure 9:
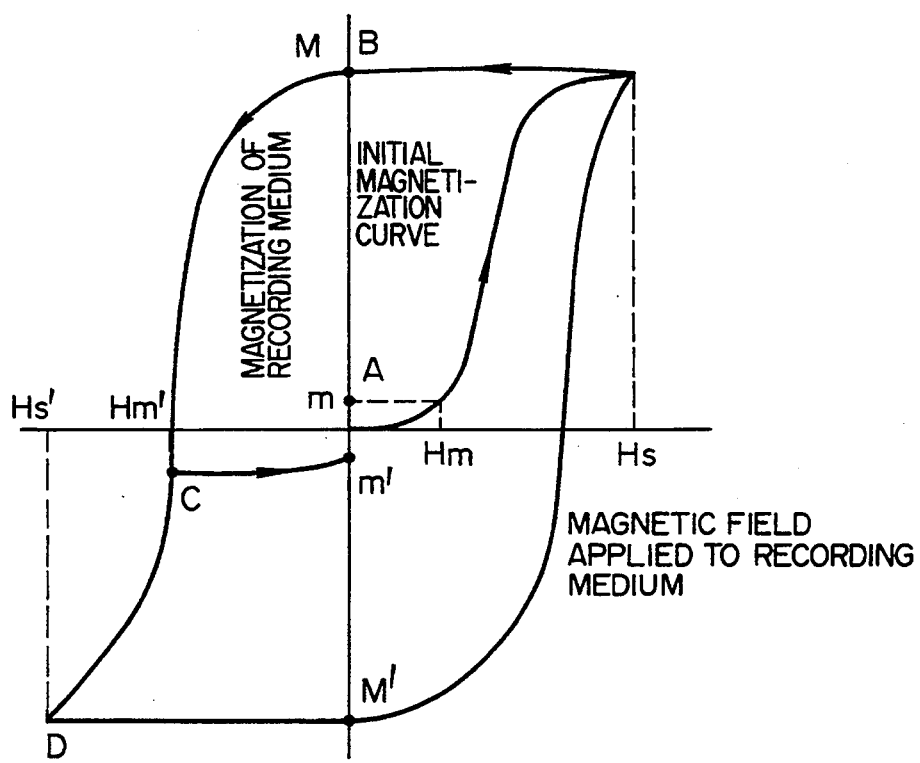
FIG. 9 is a graph for explaining characteristics of a magnetic recording medium.

The magnetic field distribution which is formed by the magnetic head and satisfies a relation m/M<1/20, is dependent on the hysteresis characteristics of the recording medium. FIG. 9 shows the above fact. In FIG. 9, reference characters M and M' designate residual magnetization, m is equal to M/20, and m' is equal to M'/20. Further, reference symbol $H_s$ designates an external magnetic field necessary for increasing the magnetization of the recording medium to saturation, $H_m$ a magnetic field necessary for magnetizing the recording medium to the value m, and $H'_m$ an external magnetic field applied to the recording medium which has been magnetized to saturation, for magnetizing the recording medium to the value m'.

When a magnetic field applied to the recording medium which has been subjected to the A.C. erase is increased, the magnetization of the recording medium proceeds along an initial magnetization curve which starts from an origin A. At this time, if a main magnetic field formed by the magnetic head for defining a narrow track width is greater than $H_s$ and a peripheral magnetic field formed by the magnetic head is less than $H_m$, a recording track having the narrow track width is magnetized to the value M, and thus the magnetic recording for a narrow track can be made. Further, in a case where the D.C. erase has been performed for the recording medium, the magnetization of the recording medium starts from a point B, and proceeds in a direction opposite to the direction of initial magnetization curve. At this time, if a main magnetic field formed by the magnetic head for defining the narrow track width is greater than $H_s$ and a peripheral magnetic field formed by the magnetic head is less than $H'_m$, a relation m'<M'/20 is satisfied, and magnetic recording for a narrow track can be made. In a case where each of a ratio $H_m/H_s$ and a ratio $H'_m/H_s$ approaches one (1), the recording medium is an ideal one.

In this case, when a main magnetic field formed by the magnetic head for defining the narrow track width is made slightly stronger than a peripheral magnetic field formed by the magnetic head, the magnetic recording for the narrow track can be made. In many of ordinary recording media, however, the ratio $H_m/H_s$ is about ⅓. As can be seen from the above, in a case where magnetic recording for a narrow track is made, the allowable range of ratio $H_m/H_s$ is determined by a main magnetic field formed by a magnetic head for defining a small track width and a peripheral magnetic field formed by the magnetic head.

The main magnetic field formed by the magnetic head for defining the narrow track width, and the peripheral magnetic field formed by the magnetic head, were measured by the electron beam computerized tomography method using the Lorentz effect. Three kinds of magnetic heads were fabricated, and the first, second and third kinds of magnetic heads corresponded to a track width of 1 μm, a track width of 2 μm and a track width of 5 μm, respectively. The magnetic poles of each of the magnetic heads were made of permalloy having a saturated magnetic flux density of 1T. The magnetic field distribution formed by each magnetic head was measured for a plurality of values of etching depth for the magnetic poles. It was confirmed that the magnetic heads generate the same main magnetic field (namely, the same peak magnetic field) and the same peripheral magnetic field when the magnetic heads have equal ratios of the etching depth for the magnetic poles to the track width.

Figure 10:
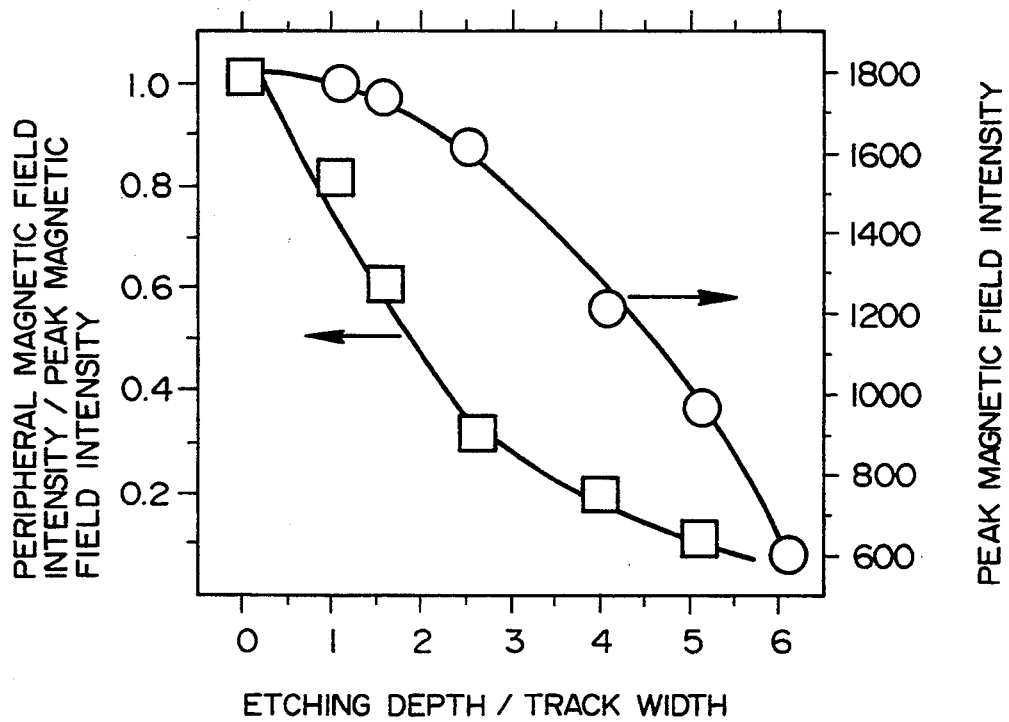
FIG. 10 is a graph showing relations between the etching depth for a magnetic pole and the magnetic field generated by a magnetic head.

Accordingly, FIG. 10 shows a relation between the etching depth normalized by the track width and a ratio of the peripheral magnetic field to the peak magnetic field, and a relation between the normalized etching depth and the peak magnetic field. As is apparent from FIG. 10, the ratio of the peripheral magnetic field to the peak magnetic field is decreased as the etching depth is increased, and the peak magnetic field is abruptly reduced to a value less than the coercivity of a recording medium when the ratio of the peripheral magnetic field to the peak magnetic field becomes less than 1/5. Accordingly, when the peripheral magnetic field is made stronger than one-fifth the magnetic field for defining a narrow track width, and a magnetic head for forming such a magnetic field distribution is combined with a recording medium having hysteresis characteristics that the ratio $H_m/H_n$ or $H'_m/H_s$ in FIG. 9 is greater than 1/5, magnetic disk storage is obtained which is suitable for magnetic recording for a narrow track.

EMBODIMENT-4

It has been already explained that when the etching depth in a magnetic head mentioned in EMBODIMENT-1 for realizing a narrow track width is made greater than a predetermined value, the magnetic head cannot generate a strong magnetic field. Relations among the maximum value of etching depth (namely, maximum permissible limit of etching depth), the area of a magnetic pole, and the saturated magnetic flux density were investigated for a case where the magnetic head was combined with a magnetic recording medium having a ratio $H_m/H_n$ (or $H'_m/H_s$) greater than 1/5.

Figure 11:
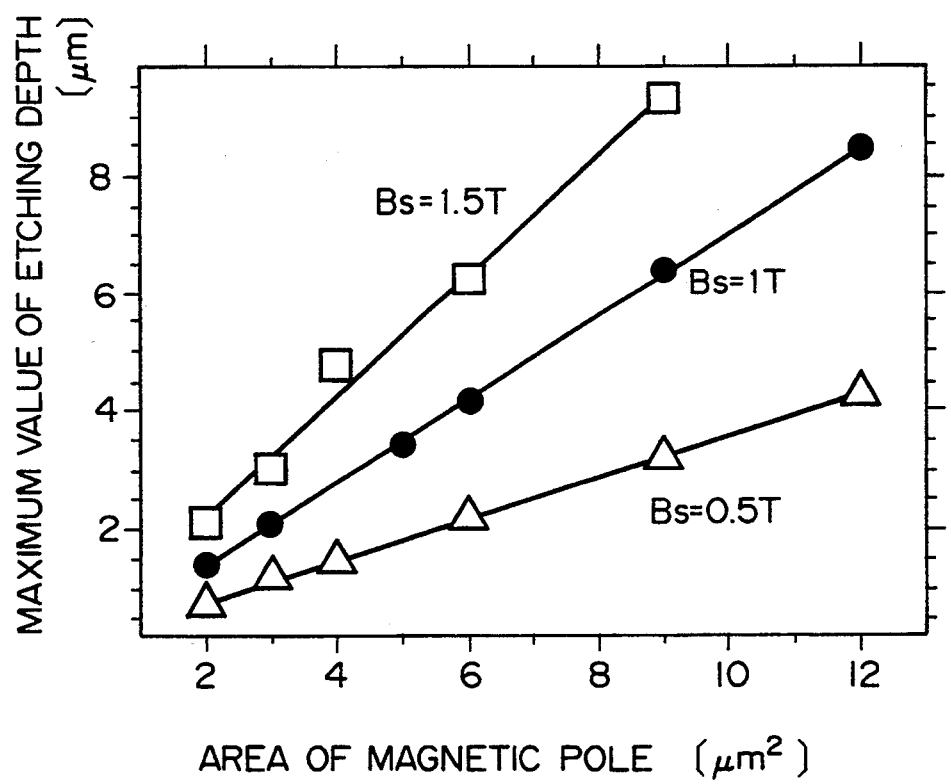
FIG. 11 is a graph showing relations between that surface area of a magnetic pole which is exposed to an air bearing surface, and the etching depth for the magnetic pole.

FIG. 11 shows the results of the investigation. In FIG. 11, the area of that portion of a magnetic pole which is exposed to an air bearing surface is plotted as the abscissa, and the maximum value of etching depth for the magnetic pole in a case where magnetic recording for a narrow track is possible, is plotted as the ordinate.

In the above investigation, three kinds of magnetic poles were used. The first kind of magnetic pole, the second kind of magnetic pole and the third kind of magnetic pole were made of a magnetic material having a saturated magnetic flux density of 0.5T, a magnetic material having a saturated magnetic flux density of 1T and a magnetic material having a saturated magnetic flux density of 1.5T, respectively.

FIG. 11 shows that the maximum value $d_{max}$ of etching depth is substantially proportional to each of the area s of the magnetic pole and the saturated magnetic flux density $B_s$ of the magnetic pole, and is given by the following equation:

$$d_{max}[\mu m] = 0.7[1/(\mu m \cdot T)] \cdot s[\mu m^2] \cdot B_n[T] \quad \text{(Eq. 1)}$$

A magnetic head satisfying the equation (1) was fabricated, and a recording medium mentioned in EMBODIMENT-3 was combined with the magnetic head, to make possible magnetic recording for a narrow track.

EMBODIMENT-5

Figure 12:
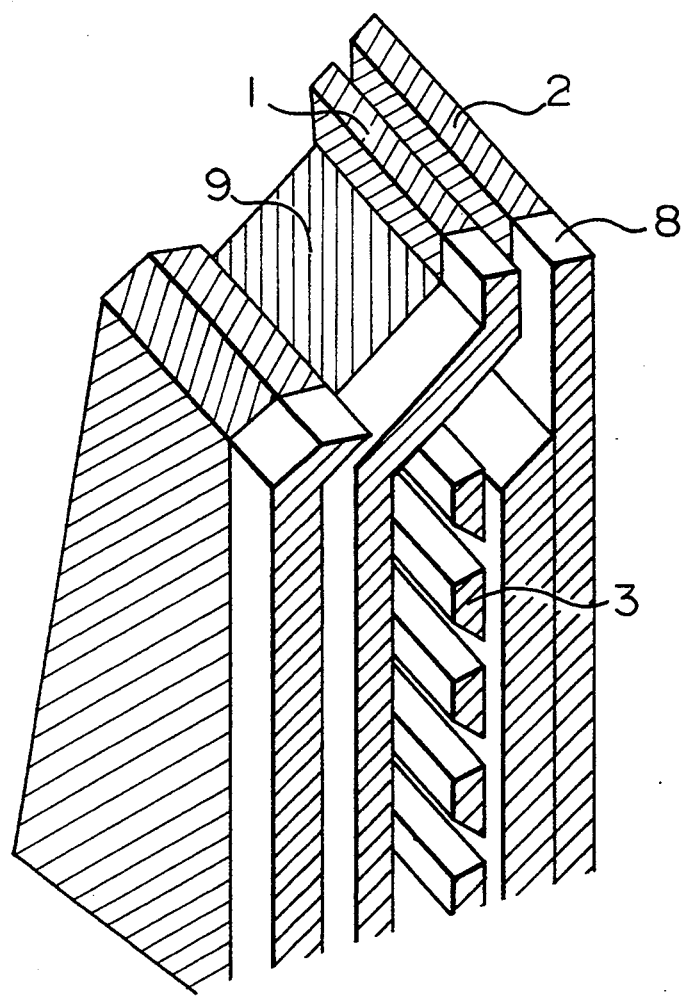
FIG. 12 is a diagram showing a cross section of a magnetic head according to the fifth embodiment of the present invention.

The magnetic field distribution mentioned in EMBODIMENT-1 can be obtained without forming a difference in level at the tip of a magnetic pole, by a method other than the method mentioned in EMBODIMENT-1 (that is, a method of eliminating the difference in level by filling a recess with an appropriate material). FIG. 12 shows a magnetic head of another kind according to the present invention. Referring to FIG. 12, a magnetic path is formed of a plurality of parts, which have an exciting coil in common. That is, the magnetic path is made of a plurality of magnetic materials. In FIG. 12, reference numeral 8 designates a magnetic material having a large saturated magnetic flux density for generating a strong magnetic field, and 9 a magnetic material having a small saturated magnetic flux density.

A magnetic head having the above structure can be fabricated by using the lift-off method in a manufacturing process. That is, magnetic poles on both sides are first formed by using a mask, a photo-resist layer is formed on the side magnetic poles, and then a magnetic pole for defining a narrow track width is formed between the side magnetic poles. Each of an upper magnetic pole and a lower magnetic pole is formed in the above manner. The side magnetic poles are made of the magnetic material 9 (for example, permalloy), and the central magnetic pole for defining the small track width is made of the magnetic material 8, which is greater in saturated magnetic flux density than the magnetic material 9. For example, Sendust (Fe-Si-Al alloy) is used as the magnetic material 8.

A magnetic head was fabricated by the above method, and the magnetic field distribution generated by the magnetic head was measured by the electron beam computerized tomography method using the Lorentz effect. It was confirmed that the magnetic field distribution formed by the magnetic head was substantially identical with the magnetic field distribution mentioned in EMBODIMENT-1, and produced the same effect as the effect of the magnetic field distribution mentioned in EMBODIMENT-1.

In the above explanation, the magnetic pole for defining a narrow track width and each side magnetic pole have an exciting coil in common. Alternatively, a coil for exciting the side magnetic poles may be formed independently of a coil for exciting the magnetic pole which defines the narrow track width.

EMBODIMENT-6

FIG. 13 shows the structure of tip portions of magnetic poles included in a magnetic head of a further kind according to the present invention. In FIG. 13, reference numerals 10 and 11 respectively designate upper and lower magnetic poles made of, for example, Sendust, for forming a main magnetic field corresponding to a narrow track width, and 12 and 13 magnetic poles made of, for example, permalloy, for forming a magnetic field around the main magnetic field. The magnetic poles 12 and 13 are disposed on both sides of the magnetic poles 10 and 11 viewed from the longitudinal recording direction, and have a width larger than the width of the magnetic poles 10 and 11. The magnetic poles 12 and 13 form a magnetic path.

Each of the magnetic poles 10 and 11 for defining a narrow track width has a small cross section. Accordingly, when only the magnetic poles 10 and 11 are included in the magnetic head, the magnetic poles 10 and 11 cannot generate a strong magnetic field for magnetizing a recording medium and for performing a recording operation. Further, a magnetic field formed by the large-width magnetic poles 12 and 13 is weaker than the coercivity of the recording medium.

However, when the magnetic poles 10 and 11 and the magnetic poles 12 and 13 are excited, a magnetic field formed by the magnetic poles 10 and 11 for defining the narrow track width is made stronger than the coercivity of the recording medium by a magnetic field which is formed by the magnetic poles 12 and 13, while keeping the distribution pattern of the former magnetic field. Accordingly, a recording operation for a narrow track can be performed.

When a magnetic field formed by the large-width magnetic poles 12 and 13 have no effect on the recording medium in a recording period, that is, the above magnetic field is preferably made weaker than two-thirds the coercivity of the recording medium, the magnetic poles 10 to 13 may be disposed so that the magnetic poles 10 and 11 are kept in contact with the magnetic poles 12 and 13, respectively. Further, it is not always required that the magnetic poles 10 and 11 for defining the small track width and the magnetic poles 12 and 13 for reinforcing a magnetic field generated by the magnetic poles 10 and 11, have an exciting coil in common, but the magnetic poles 10 and 11 and the magnetic poles 12 and 13 may have different exciting coils. In this case, an exciting current flowing through one of the above coils is not required to be equal to an exciting current flowing through the other coil. For example, an exciting current for the magnetic poles 12 and 13, which are used to reinforce a main magnetic field for defining a narrow track width, may be a D.C. current, or the magnetic poles 12 and 13 may be excited only at a necessary time. Further, the magnetic pole 12 on the trailing side may be omitted, that is, the magnetic field distribution formed by magnetic poles may have a steep slope on the trailing side.

EMBODIMENT-7

In a case where a reproducing operation is performed by a magnetic head which has a structure mentioned in EMBODIMENT-1, those portions of magnetic poles which are exposed to an air bearing surface are close to a recording medium, and thus can detect a recording signal having wavelength components in a wide wavelength range from a long wavelength to a short wavelength. Meanwhile, those peripheral portions of the magnetic poles which are etched from the air bearing surface to a predetermined depth can detect only a signal having a long wavelength. This fact can be explained from the spacing dependence of a reproduced output $E_{out}$, which is given by the following equation:

$$E_{out} = 54.6 \, d/\lambda \, (dB) \tag{Eq. 2}$$

where $\lambda$ indicates a recording wavelength, and d the distance between the recording medium and the magnetic poles. By utilizing this relation among the reproduced output $E_{out}$, the recording wavelength $\lambda$ and the distance d, it is possible to realize a magnetic disk storage provided with a magnetic head which can perform a tracking operation without using special means. This magnetic disk storage will be explained below, with reference to FIG. 14.

Referring to FIG. 14, a sub-track 32 where a tracking signal having a long wavelength has been recorded, is formed on a recording medium 30 along a track 31 for recording information, that is, the subtrack 32 is formed on one side or both sides of the track 31. The tracking signal having the long wavelength is previously recorded at a time when a magnetic disk is initialized. When a magnetic head 40 capable of defining a narrow track width which has a structure mentioned in EMBODIMENT-1 (that is, a structure that a peripheral portion of each magnetic pole is etched to a predetermined depth performs a reproducing operation for the magnetic disk) the tracking signal having the long wavelength is detected simultaneously with the detection of magnetically-recorded information. Thus, the magnetic head can perform the tracking operation.

Further, such a tracking operation can also be performed by a read/write magnetic head. That is, when the reproduction sensitivity of a read head has two or more levels and a sensitivity curve has three or more inflection points in the direction of track width, the read head can perform the tracking operation.

Further, the tracking signal may be written on the magnetic disk by the following method. Grooves 33 are first formed at a predetermined interval along the track 31 (that is, on one side or both sides of the track 31). The predetermined interval is made greater than or equal to a long wavelength which can be detected by a peripheral magnetic field formed by the magnetic head 40. Next, the recording medium 30 is magnetized in one direction parallel to the circumferential direction of the magnetic disk. Thus, a magnetic field leaks out to a space through the grooves 33, and is used as the tracking signal.

As has been explained in the foregoing, a main magnetic field generated by a magnetic head for performing a recording operation and for defining a track width, can have a narrow width in the direction of track width, without being weakened. Thus, according to the present invention, there is provided a magnetic head which defines a narrow track width and can perform a high-density recording/reproducing operation for a magnetic recording medium having high coercivity.

We claim:

1. A magnetic head for performing either a recording operation or a reproducing operation for a recording medium, comprising a first pair of magnetic pole portions for producing a main magnetic field distribution extending in a track width direction corresponding to the width of a recording track of the recording medium, and a second pair of magnetic pole portions for producing a peripheral magnetic field distribution extending in the track width direction spread beside or around the main magnetic field distribution, the magnetic pole portions in said first pair being formed at symmetrical points with respect to a gap between said magnetic poles.

2. A magnetic head for performing either a recording or reproducing operation for a recording medium, wherein a distribution of a magnetic field formed by the magnetic head is obtained by combining a distribution of a main magnetic field corresponding to the width of a recording track of the recording medium, with a distribution of a peripheral magnetic field spread beside or around the main magnetic field distribution; and wherein said magnetic head comprises magnetic poles including a first pair of magnetic pole portions for producing the main magnetic field distribution corresponding to the width of the recording track and a second pair of magnetic pole portions for producing the peripheral magnetic field distribution spread beside or around the main magnetic field distribution, the magnetic pole portions in said first pair being formed at symmetrical positions with respect to a gap between said magnetic poles.

3. A magnetic head according to claim 2, wherein the first pair of magnetic pole portions and the second pair of magnetic pole portions have different respective coercivities.

4. A magnetic tape storage comprising a magnetic head according to claim 2.

5. A magnetic head for performing either a recording or reproducing operation for a recording medium, wherein a distribution of a magnetic field formed by the magnetic head is obtained by combining a distribution of a main magnetic field corresponding to the width of a recording track of the recording medium, with a distribution of a peripheral magnetic field spread beside or around the main magnetic field distribution;

wherein said magnetic head has first and second pairs of magnetic poles for respectively generating the main magnetic field and the peripheral magnetic field; and wherein the first and second pairs of magnetic poles have different respective coercivities.

6. A magnetic head for performing either a recording or reproducing operation for a recording medium, wherein a longitudinal magnetic field distribution formed by the magnetic head has at least three inflection points in at least one of a recording track width direction and a longitudinal recording direction, and a longitudinal magnetic field due to the magnetic head has at least two intensity levels of magnetic field at the same time;

wherein said magnetic head has first and second pairs of magnetic poles for respectively generating the main magnetic field and the peripheral magnetic field; and wherein the first and second pairs of magnetic poles have different respective coercivities.

7. A magnetic head for performing either a recording or reproducing operation for a recording medium, wherein a distribution of a magnetic field formed by the magnetic head is obtained by combining a distribution of a main magnetic field corresponding to the width of a recording track of the recording medium, with a distribution of a peripheral magnetic field spread beside or around the main magnetic field distribution;

wherein said magnetic head has first and second pairs of magnetic poles for respectively generating the main magnetic field and the peripheral magnetic field; and wherein each of the first and second pairs of magnetic poles respectively includes two poles arranged on opposite sides of a gap to form said main magnetic field and said peripheral magnetic field;

wherein each of the poles of the first and second pairs of magnetic poles has a respective surface facing the recording medium; and wherein the surface of one pole of the second pair of magnetic poles inclines with respect to the surface of the recording medium and with respect to the surfaces of the poles of the first pair of magnetic poles.

8. A magnetic head according to claim 7, wherein both poles of the second pair of magnetic poles incline with respect to the surface of the recording medium and with respect to the surfaces of the poles of the first pair of magnetic poles.

9. A magnetic head according to claim 8, wherein the direction of incline of each of the poles of the second pair of magnetic poles is transverse to the direction of rotation of the recording medium.

10. A magnetic head for performing either a recording or reproducing operation for a recording medium, wherein a distribution of a magnetic field formed by the magnetic head is obtained by combining a distribution of a main magnetic field corresponding to the width of a recording track of the recording medium, with a distribution of a peripheral magnetic field spread beside or around the main magnetic field distribution;

wherein said magnetic head has first and second pairs of magnetic poles for respectively generating the main magnetic field and the peripheral magnetic field; and wherein one of the second pair of magnetic poles has a different coercivity that the coercivity of either of the first pair of magnetic poles.

11. A magnetic head for performing either a recording or reproducing operation for a recording medium, wherein a distribution of a magnetic field formed by the magnetic head is obtained by combining a distribution of a main magnetic field corresponding to the width of a recording track of the recording medium, with a distribution of a peripheral magnetic field spread beside or around the main magnetic field distribution;

wherein said magnetic head has first and second pairs of magnetic poles for respectively generating the main magnetic field and the peripheral magnetic field;

wherein the first pair of magnetic poles are separated by a first gap defining a first distance; and wherein the second pair of magnetic poles are separated by a second gap defining a second distance that is greater than the first distance.

12. A magnetic head for performing either a recording or reproducing operation for a recording medium, wherein a distribution of a magnetic field formed by the magnetic head is obtained by combining a distribution of a main magnetic field corresponding to the width of a recording track of the recording medium, with a distribution of a peripheral magnetic field spread beside or around the main magnetic field distribution;

wherein said magnetic head has first and second pairs of magnetic poles for respectively generating the main magnetic field and the peripheral magnetic field;

wherein the first pair of magnetic poles are separated by a gap;

wherein the second pair of magnetic poles are separated by the gap; and wherein the second pair of magnetic poles extend in a direction transverse to the rotation direction of the recording medium and in a plane parallel to the plane of the recording medium.

13. A magnetic head according to claim 12, wherein one of the second pair of magnetic poles includes first and second portions disposed on opposite sides of one of the first pair of magnetic poles on the same side of the gap such that the one of the first pair of magnetic poles projects in the direction of the recording medium from the first and second portions of the one of the second pair of magnetic poles sharing the same side of the gap.

14. A magnetic head according to claim 13, wherein a distance by which the one of the first pair of magnetic poles projects from the first and second portions of the one of the second pair of magnetic poles sharing the same side of the gap is at most $0.7[1/(\mu m^2)] \cdot s[\mu m^2] \cdot B_s \cdot [T]$, wherein s and $B_s$ are respectively an area exposed to an air bearing surface and a saturation magnetic flux density of the one of the first pair of magnetic poles.

15. A magnetic head according to claim 13, wherein a distance by which the one of the first pair of magnetic poles projects from the first and second portions of the one of the second pair of magnetic poles is sufficiently large so that the main magnetic field is larger than a coercivity of the recording medium and so that the peripheral magnetic field is less than the coercivity of the recording medium.

* * * * *